Feb. 23, 1965    R. P. ROHDE ETAL    3,170,378
HYDRAULIC MOTOR

Filed Dec. 12, 1962    2 Sheets-Sheet 1

INVENTORS
ROBERT P. ROHDE
BY WILLIAM B. THOMPSON

THEIR ATTORNEY

Feb. 23, 1965  R. P. ROHDE ETAL  3,170,378
HYDRAULIC MOTOR

Filed Dec. 12, 1962                                   2 Sheets-Sheet 2

INVENTORS
ROBERT P. ROHDE
BY WILLIAM B. THOMPSON

THEIR ATTORNEY

United States Patent Office 3,170,378
Patented Feb. 23, 1965

3,170,378
HYDRAULIC MOTOR
Robert P. Rohde, Saginaw, and William B. Thompson, Frankenmuth, Mich., assignors to General Motors Corporation, Detroit, Mich., a corporation of Delaware
Filed Dec. 12, 1962, Ser. No. 244,046
5 Claims. (Cl. 91—224)

This invention pertains to hydraulic motors, and particularly to a hydraulically operated reciprocating motor adapted for actuating vehicle windshield wipers.

Heretofore, hydraulically operated reciprocating motors for actuating vehicle windshield wipers have been developed wherein hydraulic fluid under pressure is alternately ported to each side of a piston while the opposite side of the piston is connected to drain. In prior art motors of the aforesaid type, the alternate connection of the opposed motor chambers to drain and pressure is controlled by a reversing valve which, during a portion of its movement, momentarily connects the pressure line to the drain line. Under these conditions, it is possible to bleed sufficient pressure from the pressure line to the drain line to cause both the reversing valve and the motor piston to stall. The present invention relates to an improved hydraulically operated reciprocating motor having a differential area piston and a servo operated differential area reversing valve thus enabling the motor to be operated by alternately connecting only one side of the piston and only one end of the reversing valve to pressure and drain.

Accordingly, among our objects are the provision of a fluid pressure operated motor having a differential area piston which is continuously subjected to pressure in one direction during motor operation; the further provision of a fluid pressure operated motor having a differential area reciprocable piston which carries reversing valve means for alternately connecting the larger area of the piston to pressure and drain; the further provision of a fluid pressure operated motor of the aforesaid type including energy storing means for moving the piston beyond its normal running stroke to a parked position when the application of fluid under pressure is interrupted; and the still further provision of a fluid pressure operated motor having a differential area reciprocable piston which carries a servo operated reversing valve of the differential area type and wherein the pressure and drain connections to the reversing valve are such that the pressure and drain lines are never directly connected through the reversing valve.

The aforementioned and other objects are accomplished in the present invention by utilizing a differential area reciprocable piston which carries a servo operated spring biased reversing valve for alternately connecting the larger area of the piston to pressure and drain. Specifically, the piston is supported for reciprocable movement in a cylinder and the rod end of the piston is continuously pressurized when the manual control valve is open. The head end of the piston is engageable by a power spring which is capable of moving the piston beyond its normal running stroke to a parked position when the manual valve is closed. The reversing valve is servo actuated in one direction and spring actuated in the opposite direction adjacent the normal running stroke ends of the piston through a piston and cylinder controlled passage so as to maintain the piston in a state of continuous reciprocation when the manual control valve is open.

Further objects and advantages of the present invention will be apparent from the following description, reference being had to the accompanying drawings, wherein a preferred embodiment of the present invention is clearly shown.

Figure 1:
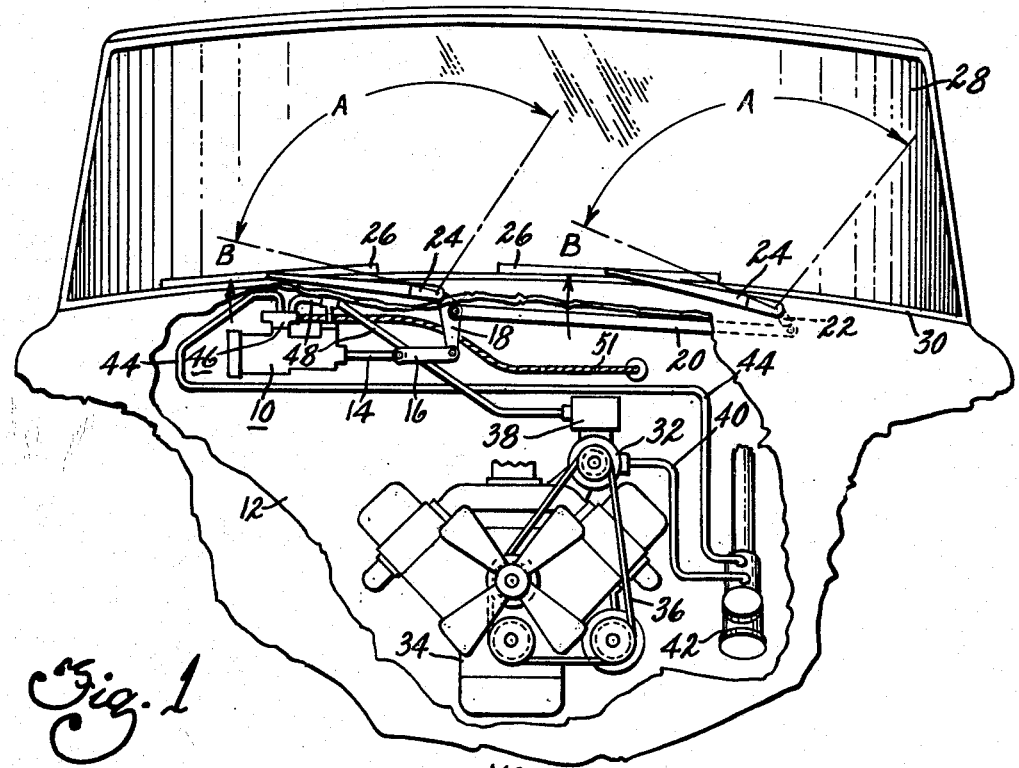
FIGURE 1 is a fragmentary view with certain parts broken away depicting a motor vehicle windshield cleaning system utilizing the hydraulic motor of this invention.

Referring to FIGURE 1, a hydraulic motor 10 constructed according to the present invention is shown attached to a vehicle firewall 12 on the engine compartment side thereof. The motor 10 includes a reciprocable rod 14 which is pivotally connected at its outer end to a link 16, the link 16 being in turn pivotally connected to a drive arm 18 which is attached to a pivot shaft, not shown. The drive arm 18 is connected by a link 20 to a second drive arm 22 attached to a second pivot shaft, not shown. A pair of wiper arms 24 are drivingly connected to the spaced pivot shafts and carry wiper blades 26 for movement across the outer surface of a windshield 28. As shown, the arms 24 and the blades 26 are oscillated in phase, or in tandem, throughout running strokes A having predetermined inboard and outboard stroke end limits and are also movable through parking strokes B to depressed parked positions against the lower reveal molding 30 of the windshield.

The hydraulic wiper motor 10 can be used with either open center or closed center hydraulic systems, an open center system being of the type wherein hydraulic fluid under pressure can freely circulate through the manual control valve in the "Neutral" or off, position; while the closed center hydraulic system is of the type wherein fluid is not permitted to circulate freely when the manual control valve is closed thereby subjecting the manual control valve to a pressure head, and wherein the pump charges an accumulator. The motor 10 is shown connected in an open center hydraulic system in FIGURE 1, the hydraulic pressure being derived from a power steering, or other accessory, pump 32 continuously driven from the vehicle engine 34 through a belt 36. The pump 32 includes a reservoir 38 from which it draws hydraulic fluid and delivers the hydraulic fluid under pressure to a pressure conduit 40 which, as shown, is connected to an open center power steering valve 42. A return conduit 44 from the power steering valve 42 is connected with a manual control valve 46 of the motor 10, the manual control valve also having a connection with a drain conduit 48 which also connects with a drain port 50 of the hydraulic motor and the reservoir 38 for the pump 32. The manual control valve 46 may be operated through a Bowden wire 51 from an instrument panel mounted control.

Figure 2:
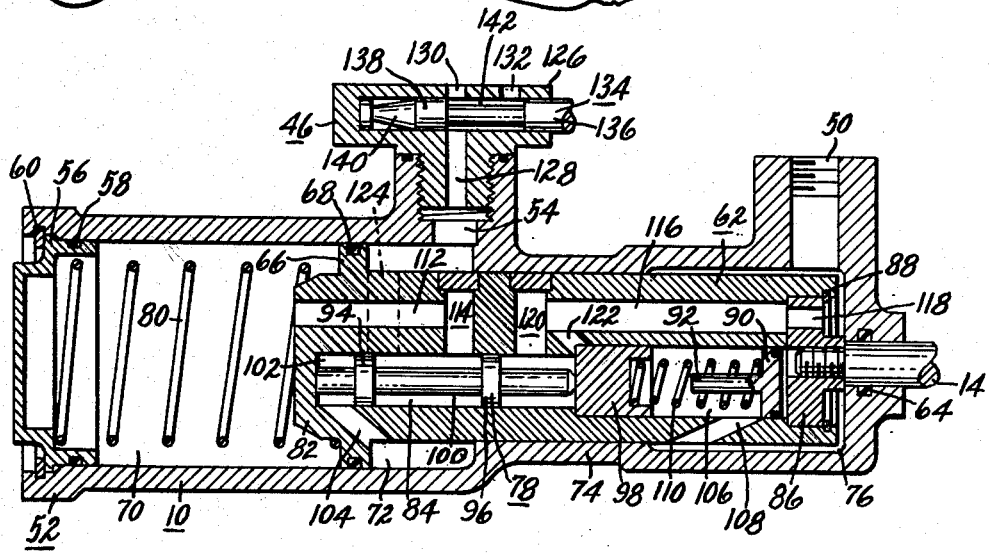
FIGURE 2 is a longitudinal sectional view of the hydraulic motor of this invention shown in the parked position.
Figure 3:
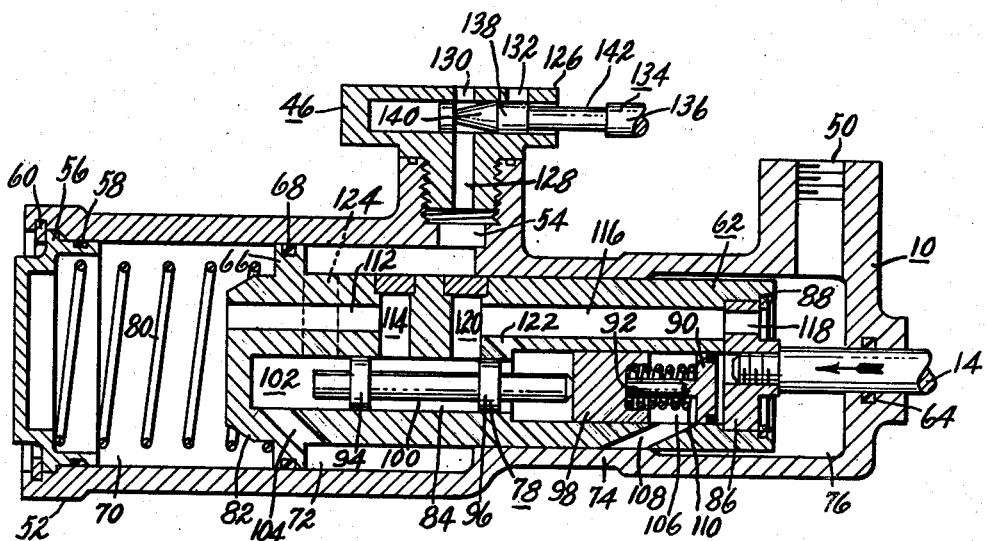
FIGURES 3 and 4 are views similar to FIGURE 2 depicting running stroke positions of the motor piston.
Figure 4:
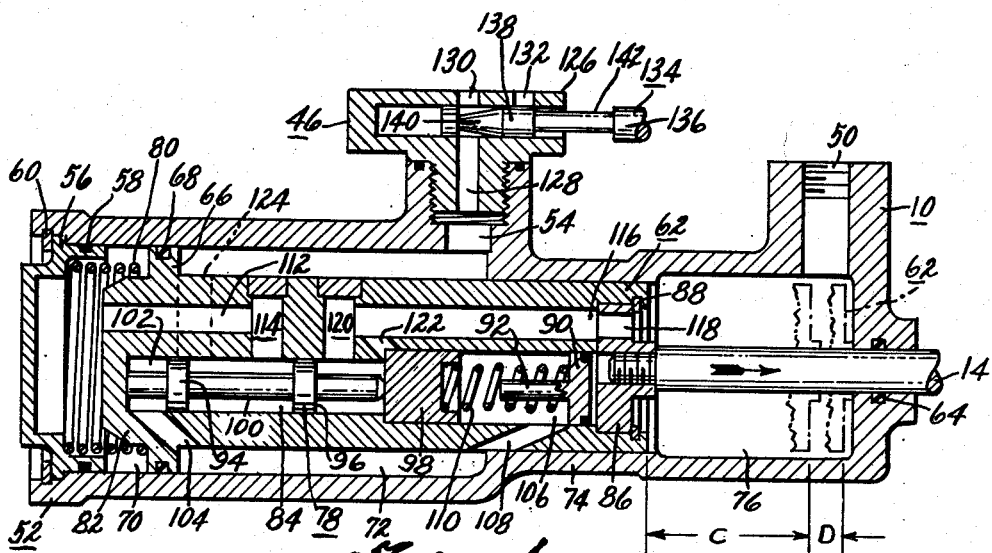

Referring to FIGURES 2 through 4, the hydraulic motor 10 comprises a cylinder, or housing, 52 having a pressure port 54 as well as the drain port 50. The head end of the cylinder 52 is closed by a plug 56 which carries a seal 58 and is held in assembled relation with the cylinder by a snap ring 60. A reciprocable piston 62 is disposed within the cylinder 52 and is threadedly connected to the rod 14 which extends through a bore in the rod end of the cylinder and a seal ring 64. The piston 52 includes a head 66 carrying a seal 68, the piston head 66 being disposed within the largest diameter portion of the stepped bore in the cylinder, and dividing it into opposed expansible chambers 70 and 72.

As seen in the drawings, the body portion of the piston 62 is snugly and slidably disposed within the smallest diameter bore of the cylinder defined by an internal shoulder 74, while the drain port 50 communicates with a cylinder bore portion 76 which has a diameter greater than the body of the piston but less than the diameter of the opposed working chambers 70 and 72.

It will be appreciated that the area of the piston head 66 exposed to the chamber 70 is appreciably greater than the area of the piston head 66 exposed to the chamber 72 and, thus, the piston may be described as a differential area piston. The cylindrical chamber 72 is continuously connected to the pressure port 54, and thus when the motor is operating the smaller diameter area of the differential piston is always subjected to hydraulic fluid under pressure. Piston reciprocation is accomplished by alternately connecting the head end chamber 70 to pressure and drain by a piston carried reversing valve 78 in a manner to be described hereinafter. In addition, a coil spring 80 is disposed in the head end chamber 70, opposite ends of the coil spring seating in the plug 56 and on a protruding shoulder portion 82 of the piston head. The spring 80 functions to move the piston 62 to its parked position wherein the piston abuts the rod end of the cylinder as shown in FIGURE 2, when the manual control valve is closed thereby interrupting the application of pressure to the motor.

The body of the piston 62 is formed with an axially extending stepped diameter bore 84 which is closed at the head end of the piston by the shoulder 82, and at the rod end of the piston by a plug 86 to which the rod 14 is threadedly connected. The plug 86 is held in assembled relation with the piston by a snap ring 88. In addition, the larger diameter portion of the bore 84 contains a plug 90 which is press fitted therein and includes an integral axially extending pin 92 constituting a spring guide and a stop for the reversing valve 78.

The reversing valve 78 is of the spool type including axially spaced lands 94 and 96 which are disposed in the smaller diameter portion of the stepped bore 84. An enlarged plunger 98 is disposed in the larger diameter portion of the bore 84. An annular groove 100 is formed between the lands 94 and 96. The portion of the bore 84 to the left of the land 94 constitutes a servo chamber 102 which is connected by a piston passage 104 to the motor chamber 72. The larger diameter portion of the bore 84 to the right of the plunger 98 constitutes a servo chamber 106 which is connected to a piston passage 108. A coil spring 110 is disposed between the plug 90 and the plunger 98 and biases the reversing valve 78 to the left, as seen in FIGURES 2 through 4. The piston passage 108 is connected to either the drain chamber 76, is blocked by the internal cylinder shoulder 74, or is connected to the cylinder chamber 72 according to the position of the piston 62 within the cylinder, and thus constitutes a piston and cylinder controlled passage through which the reversing valve 78 is servo actuated.

The body of the piston 62 is also formed with an axial passage 112 that connects the cylinder chamber 70 with a radial passage 114, the radial passage 114 constituting the port of the reversing valve 78 since it communicates with the smaller diameter portion of the bore 84. A second axial piston passage 116 is continuously connected through a hole 118 in the plug 86 with the drain chamber 76, the piston passage 116 connecting with a second radial passage 120 constituting a second port of the reversing valve 78. The axial passage 116 also communicates with a diagonal piston passage 122 which interconnects passage 118 and the larger diameter portion of the bore 84 to the left of the plunger 98 with the drain passage 116. A radial piston passage 124 forms the pressure inlet port for the reversing valve, the passage 124 communicating with the cylinder chamber 72.

Operation of the hydraulic motor in an open center hydraulic system can be controlled by a manual control valve 46 such as depicted in FIGURES 2 through 4 which comprises a housing 126 attached to the cylinder 52 having an outlet port 128 connected to the pressure port 54 of the motor, an inlet port 130 connected to the return conduit 44 and a drain port 132 connected to the drain conduit 48. It is to be understood, of course, that the drain port 50 of the motor is likewise connected to the drain conduit 48. A reciprocable spool valve 134 is disposed within the valve body 126, the spool valve including spaced lands 136 and 138, the land 138 having a tapered end portion 140 constituting a throttling valve for controlling the speed of motor operation. In the "off" position of the valve 134, the return conduit 44 is interconnected with the drain conduit 48 through the annular groove 142 between the lands 136 and 138 and ports 130 and 132. Likewise, the motor chamber 72 is connected to the drain conduit through port 128, the annular groove 142 and the port 132. When the valve 134 is moved to the "open" position, the land 138 blocks communication between ports 130 and 132 while interconnecting ports 130 and 128 so that hydraulic fluid under pressure from the return conduit 44 will be diverted to the hydraulic motor. Under these circumstances the hydraulic motor will restrict free circulation of the hydraulic fluid so as to cause the pressure of pump 32 to build up rapidly thereby providing the necessary pressure head to operate the hydraulic wiper motor 10.

When the manual control valve 132 is moved to the "off" position as shown in FIGURE 2, the motor chamber 72 is connected to the drain conduit 48 thus allowing the power spring 80 to move the piston 62 beyond one end of its normal running stroke to a parked position wherein the piston bottoms out on the rod end of the cylinder. The spring 80 will retain the piston 62 in the parked position. When the valve 134 is opened, the pressure is supplied to the port 54 and hence to the motor chamber 72, which pressure will be communicated to the piston valve passage 124, and through the piston passage 104 to the servo chamber 102 of the reversing valve. At this time pressure will also be supplied to the motor chamber 70 through passage 124, the annular groove 100 of the reversing valve, and passages 114 and 112 thus maintaining the piston in the parked position. Since the servo chamber 106 of the reversing valve is connected to drain at this time through passage 108, the chamber 76 and the port 50, however, the pressure acting on the land 94 of the reversing valve 78 in the chamber 102 will move the reversing valve 78 to the right against the opposing force of the spring 110 to the position depicted in FIGURE 3.

As the reversing valve 78 moves to the right, the motor chamber 70 will no longer be connected to pressure, and when the reversing valve 78 bottoms out by engagement of plunger 98 with the stop 92, the motor chamber 70 is connected to drain through passages 112, 114, annular groove 100, and the passages 120, 116, the hole 118 and the chamber 76 to the drain port 50. The piston 62 will not begin moving to the left until the reversing valve 78 has completed its movement to the right by virtue of the force exerted by the spring 80. With the chamber 70 connected to drain while the chamber 72 is connected to pressure, the piston 62 will begin moving to the left. After a slight movement of the piston 62 to the left as shown in FIGURE 3, the passage 108 will be closed by the internal shoulder 74 of the cylinder thus trapping fluid in the servo chamber 106. When the piston 62 arrives at its running stroke end position as shown in FIGURE 4, the passage 108 communicates with the chamber 72, and at this time opposite ends of the reversing valve 78 are subjected to the same pressure head. Since the area of plunger 98 is greater than the area of land 94, and in addition since the spring 110 biases the reversing valve to the left, the reversing valve 78 will immediately move the valve from the position of FIGURE 3 to the position of FIGURE 4.

During movement of the reversing valve 78 from the position of FIGURE 3 to the position of FIGURE 4, and fluid trapped between land 96 and plunger 98 can flow to drain through either of passages 122 or 120 depending upon the position of the reversing valve 78. It is to be noted that the annular groove 100 between the lands 94 and 96 of the reversing valve at no time interconnects the pressure passage 124 with the drain passage 120, since the spacing of the lands 94 and 96, and the spacing of the passages 124 and 120 is such that the passage 124 is blocked from communicating with the annular groove 100 by the land 94 when the land 96 is moved to a position interconnecting drain passage 120 with the annular groove 100. The reason for the differential area plunger 98 and land 94 is to prevent a high pressure surge in the motor during movement of the reversing valve 78 from the position of FIGURE 3 to the position of FIGURE 4 during the time when the annular groove 100 neither communicates with drain passage 120 nor pressure passage 124. When this condition occurs the fluid under pressure supplied to the chamber 72 flows into the expanding servo chamber 106 through the passage 108 thus preventing a high pressure surge. The differential area of land 94 and plunger 98 insures a more positive action of the reversing valve in moving between the position of FIGURES 3 and 4.

With the reversing valve in the position of FIGURE 4, the piston 62 will begin moving to the right since both sides of the piston head are now subjected to the same pressure potential but the area of the piston exposed to the chamber 70 is substantially greater than the area of the piston exposed to the chamber 72. After the piston 62 moves to the right with hydraulic fluid under pressure being supplied to the chamber 72 through pressure passage 124, the annular groove 100 and the passages 114 and 112, the passage 108 will be closed by the internal shoulder 74 of the cylinder to again trap fluid in the servo chamber 106. When the piston 62 arrives at its other running stroke end whereat the passage 108 again communicates with the drain chamber 76, the servo chamber 106 will be connected to drain, and the pressure in chamber 102 will immediately move the reversing valve 78 from the position of FIGURE 4 to the position of FIGURE 3 thereby connecting the chamber 70 to drain while the chamber 72 remains pressurized. Thus, it can be seen that the reversing valve 78 alternately connects the head end chamber 70 to pressure and drain while the rod end chamber 72 is continuously pressurized so as to maintain the piston in a state of continuous reciprocation throughout its running stroke C as depicted in FIGURE 4, with the speed of motor operation being controlled by the position of the throttle valve portion 140. Since the reversing valve 78 never interconnects the pressure passage with the drain passage it is not possible for the reversing valve to assume a position wherein it will bleed pressure to drain so as to stall the piston.

When the manual control valve 134 is moved to the "off" position, irrespective of the position of the piston within its running stroke C, the piston 62 will immediately be moved beyond one end of its normal running stroke to the parked position wherein it bottoms out of the rod end of the cylinder as shown in FIGURE 2. This automatic parking of the piston 62 will occur since when the manual control valve is moved to the "off" position the chamber 72 is connected to drain through ports 54, 128, the annular groove 142 and port 132. Therefore, the spring 110 will automatically move the reversing valve to the position depicted in FIGURES 2 and 4, if it is not already in this position, thus interconnecting motor chambers 70 and 72 through passages 112 and 114, annular groove 100 and the passage 124. Since any remaining pressure in the two motor chambers will now be equalized, and since both chambers are now connected to the drain conduit, the power spring 80 will immediately move the piston 62 through its parking stroke D until it bottoms out on the rod end of the cylinder, thus moving the wiper blades 46 through their parking angles B to depressed parked positions as shown in FIGURE 1.

While the embodiment of the invention as herein disclosed constitutes a preferred form, it is to be understood that other forms might be adopted.

What is claimed is as follows:

1. A wiper motor including, a cylinder, a differential area piston therein, a manual control valve which, when open, constantly subjects the smaller piston area to pressure, valve means carried by said piston and actuated at opposite ends of the running stroke of the piston for alternately connecting the larger area of the piston to pressure and drain to reciprocate the same, and power means acting on the larger area of said piston for automatically parking said piston outside of its running stroke when the manual valve is moved to the "off" position whereat both piston areas are connected to drain.

2. A wiper motor including, a cylinder, a differential area reciprocable piston therein, a manual control valve which, when open, continuously subjects the smaller piston area to pressure, reversing valve means carried by said piston and actuated at opposite ends of the running stroke of the piston for alternately subjecting the larger area of said piston to pressure and drain to reciprocate the same, and energy storing means constantly acting on the larger area of said piston and automatically operable to park said piston outside of its running stroke when the manual valve is moved to the "off" position whereat both piston areas are connected to drain.

3. A wiper motor including, a cylinder, a differential area reciprocable piston therein, a manual control valve which, when open, continuously subjects the smaller area of the piston to pressure, servo actuating reversing valve means reciprocable in the piston for alternately subjecting the larger area of the piston to pressure and drain to reciprocate the same throughout a running stroke, and a power spring constantly acting on the larger area of said piston and automatically operable to park the piston outside of said running stroke when the manual valve is moved to the "off" position whereat both piston areas are connected to drain.

4. A wiper motor including, a cylinder, a differential area reciprocable piston therein, said piston dividing said cylinder into a rod end chamber and a head end chamber, a manual control valve which, when open, continuously subjects the rod end chamber to pressure, servo actuated reversing valve means carried by said piston for alternately connecting the head end chamber to pressure and drain to reciprocate the piston throughout a running stroke, and a power spring in said head chamber and acting constantly on the larger area of said piston for automatically parking the piston outside of its running stroke when the manual control valve is moved to the "off" position whereat both cylinder chambers are connected to drain.

5. A wiper motor including, a cylinder, a differential area reciprocable piston disposed in said cylinder and dividing said cylinder into a head end chamber and a rod end chamber, a manual control valve which, when open, continuously subjects the rod end chamber to pressure, differential area servo actuated reversing valve means carried by said piston having its smaller area continuously connected to said rod end chamber so as to be pressurized and the opposing larger area alternately connected to pressure and drain adjacent the ends of the running stroke of the piston through piston and cylinder controlled passage means, said reversing valve means alternately subjecting the head end chamber to pressure and drain to reciprocate the piston throughout its running stroke, and a power spring disposed in said head end chamber and acting constantly on the larger area of said piston for parking said piston outside of its running stroke when the valve is moved to the "off" position whereat both cylinder chambers are connected to drain.

References Cited in the file of this patent
UNITED STATES PATENTS

| | | |
|---|---|---|
| 745,900 | Payton | Dec. 1, 1903 |
| 1,031,340 | Howard | July 2, 1912 |
| 2,869,165 | Dermond | Jan. 20, 1959 |
| 2,943,576 | English | July 5, 1960 |